United States Patent
Arlt

[15] 3,674,829
[45] July 4, 1072

[54] CHLOROSULPHONYL VINYL ISOCYANATES AND A PROCESS FOR THEIR PRODUCTION

[72] Inventor: Dieter Arlt, Cologne-Buchheim, Germany

[73] Assignee: Farbenfabriken Bayer Aktiengesellschaft, Leverkusen, Germany

[22] Filed: June 3, 1969

[21] Appl. No.: 830,113

[30] Foreign Application Priority Data

June 6, 1968 Germany ..................... P 17 68 608.7

[52] U.S. Cl. ........................... 260/453 AL, 71/98, 252/545, 260/80 R, 260/144, 260/243 R, 260/453 AR, 260/453 P, 260/456 A, 260/513 H, 260/513 N, 260/543 R, 260/566 D
[51] Int. Cl. .................................. C07c 119/04, C07c 143/70
[58] Field of Search ................. 260/453 AR, 453 AL, 453 P, 260/465.9, 465.7, 465 G, 465 U

[56] References Cited

UNITED STATES PATENTS

| | | | |
|---|---|---|---|
| 2,675,371 | 4/1954 | Coover et al. | 260/465.9 X |
| 2,514,328 | 7/1950 | Jones | 260/453 X |
| 3,437,680 | 4/1969 | Farrissey et al. | 260/453 |

FOREIGN PATENTS OR APPLICATIONS

| | | | |
|---|---|---|---|
| F18277 | 4/1956 | Germany | 260/453 |

*Primary Examiner*—Floyd D. Higel
*Attorney*—Robert A. Gerlach and George W. Rauchfuss, Jr.

[57] ABSTRACT

Chlorosulphonyl vinyl isocyanates are produced by reacting either an $\alpha$-halogenated isocyanide dichloride or an $\alpha, \beta$-unsaturated isocyanide dichloride with a halogen sulphonic acid. The chlorosulphonyl vinyl isocyanates produced are useful in the preparation of plant protection agents, dyestuffs and detergents and as monomers for the production of plastics.

6 Claims, No Drawings

CHLOROSULPHONYL VINYL ISOCYANATES AND A PROCESS FOR THEIR PRODUCTION

This invention relates to chlorosulphonyl vinyl isocyanates. More particularly, this invention relates to chlorosulphonyl vinyl isocyanates and to a process for the production of chlorosulphonyl vinyl isocyanates.

A wide variety of processes are known for the production of organic isocyanates. The process in most general use, however, is that of phosgenation of primary amines. The use of phosgene, however, is hazardous and phosgene is poisonous. In addition, however, other methods not requiring phosgene are known for the preparation of organic isocyanates including, for example, the Curtius rearrangement of acid azides as well as the Hofmann and Lossen rearrangements. Moreover, it is known to thermally decompose carbamates and ureas to form the corresponding isocyanate. Still another method of preparing isocyanate while avoiding the use of phosgene is to react an N,N'-disubstituted or trisubstituted urea with a relatively high boiling isocyanate. The latter process results in the isocyanate separating out and leaving the organic radical of the starting material on the urea. This process, however, suffers from the disadvantage that the ureas are not very soluble in the isocyanates so that large excesses of the isocyanate initially employed are required. It is desirable to have a process for the production of isocyanates which avoids the use of phosgene because some of the amines have other phosgene sensitive groups in the molecule. Furthermore not all isocyanates are obtainable by the phosgenation of amines. It is also desirable to have a process for the production of isocyanates yielding relatively high yields of isocyanates in addition to avoiding the use of phosgene.

It is, therefore, an object of this invention to provide chlorosulphonyl vinyl isocyanates and a process for their preparation. A further object of this invention is to provide a process for the preparation of chlorosulphonyl vinyl isocyanates which avoids the use of phosgene. A further additional object of this invention is to provide a process for the preparation of chlorosulphonyl vinyl isocyanates in good yields. A still further object of this invention is to provide a process for the preparation of chlorosulphonyl vinyl isocyanates from isocyanide dichloride reactants. Another still further object of this invention is to provide chlorosulphonyl vinyl isocyanates and a process for the production thereof, which chlorosulphonyl vinyl isocyanates find use in the production of plant protecting agents, dyestuffs, detergents and as monomers for plastics.

The foregoing objects and others which become apparent from the following description are accomplished in accordance with this invention, generally speaking, by providing a process for the production of chlorosulphonyl vinyl isocyanates wherein a halogen sulphonic acid is reacted with an α-halogenated isocyanide dichloride or an α,β-unsaturated isocyanide dichloride. More particularly, the objects of this invention are accomplished by preparing chlorosulphonyl vinyl isocyanates by reacting a halogen sulphonic acid with an α-halogenated isocyanide dichloride or an α,β-unsaturated isocyanide dichloride at a temperature of from about 0° C. to about 150° C.

The new chlorosulphonyl vinyl isocyanates of this invention are prepared by a novel, chemically unique process which comprises reacting a halogen sulphonic acid with an α-halogenated isocyanide dichloride or an α,β-unsaturated isocyanide dichloride, the reaction proceeding in accordance with the following reaction sequence exemplified with the use of an α-halogenated isocyanide dichloride reactant.

wherein R, $R_1$, X and Y have the meanings defined hereinafter.

The process of this invention is suitable for the preparation of any chlorosulphonyl vinyl isocyanate of the formula

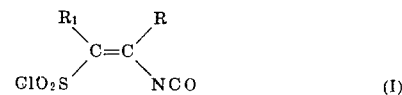  (I)

by the reaction of a halogen sulphonic acid having the formula
$$YSO_3H \quad (II)$$
with an isocyanide dichloride compound having the formula

  (III)

wherein Z is either

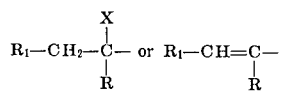

Y is a halogen atom, X is a halogen atom, preferably chlorine, and R and $R_1$ are the same or different and each represents a hydrogen atom, a halogen atom or an alkyl radical having from one to 20 carbon atoms, an aryl radical having from six to 20 carbon atoms, an alkenyl radical having from two to six carbon atoms, an aralkyl radical having from seven to 12 carbon atoms or said radicals substituted with any suitable substituent which is nonreactive with an isocyanato group or with a halogen sulphonic acid such as, for example, substituents, such as halogen, nitro, alkyl of from one to four carbon atoms, alkyl sulphonyl wherein the alkyl radical contains one to four carbon atoms, aryl sulphonyl wherein the aryl radical contains six to nine carbon atoms, alkyl carbonyl wherein the alkyl radical contains one to four carbon atoms, aryl carbonyl wherein the aryl radical contains from six to nine carbon atoms, chlorosulphonyl or chlorocarbonyl, or R and $R_1$ taken together may form an alicyclic ring. Most preferably, however, R and $R_1$ may be the same or different and each preferably is a hydrogen atom, a halogen atom, an alkyl radical containing from one to four carbon atoms, an aryl radical containing from six to nine carbon atoms or a halogen substituted alkyl radical containing from one to four carbon atoms. The halogen atom may be any suitable halogen atom such as fluorine, chlorine, bromine or iodine but is preferably chlorine or fluorine. Although R and $R_1$ may be any of the suitable radicals set forth above, the following may be mentioned as examples of suitable R and $R_1$ radicals: a hydrogen atom, a halogen atom, preferably chlorine or fluorine, an alkyl radical such as, for example, methyl, ethyl, propyl, butyl, nonyl, dodecyl, octadecyl and eicosyl and the like, aryl radicals such as, for example, phenyl, naphthyl, anthryl, tolyl and the like, aralkyl such as, for example, benzyl, phenylethyl and the like, alkenyl such as, for example, propenyl, butenyl, hexenyl and the like or said radicals substituted with lower alkyl, halo, nitro, alkoxy, alkyl sulphonyl, aryl sulphonyl, aryl carbonyl, chlorosulphonyl or chlorocarbonyl substituents. Although X and Y may be any suitable halogen atoms such as fluorine, chlorine, bromine or iodine, they are preferably chlorine atoms.

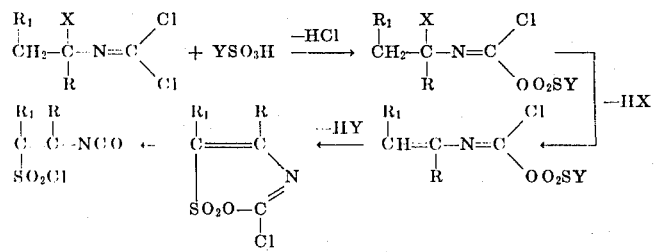

Although chlorosulphonyl vinyl isocyanates of formula (I) can be obtained from any corresponding α-halogenated isocyanide dichloride of the formula

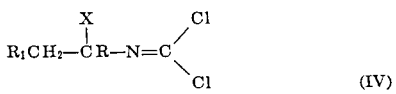
(IV)

wherein R and $R_1$ and X are as defined above, or α,β-unsaturated isocyanide dichloride of the formula

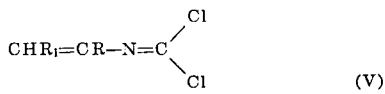
(V)

wherein R and $R_1$ are as defined above, the following may be mentioned as examples of suitable isocyanide dichloride reactants that may be used in the process according to this invention: 1-chloroethyl isocyanide dichloride, 1,2-dichloroethyl isocyanide dichloride, 1,1,2-trichloroethyl isocyanide dichloride, 1-chloro-1-chloromethylpropyl isocyanide dichloride, 2-chlorovinyl isocyanide dichloride, 1,2-dichlorovinyl isocyanide dichloride, 1-methyl-2-chlorovinyl isocyanide dichloride, and styryl isocyanide dichloride.

As examples of suitable halogen sulphonic acid reactants employed in the process of this invention there may be mentioned chlorosulphonic acid, fluorosulphonic acid, bromosulphonic acid and iodosulphonic acid. However, the process of this invention is preferably carried out utilizing chlorosulphonic acid or fluorosulphonic acid.

The process of this invention is suitable for the preparation of any chlorosulphonyl vinyl isocyanate of the formula (I) set forth hereinabove. As examples of the chlorosulphonyl vinyl isocyanates that may be prepared according to the process of this invention there may be mentioned the following:
chlorosulphonyl vinyl isocyanate,
2-methyl-2-chlorosulphonyl vinyl isocyanate,
2-phenyl-2-chlorosulphonyl vinyl isocyanate,
2-ethylphenyl-2-chlorosulphonyl vinyl isocyanate,
2-chloromethyl-2-chlorosulphonyl vinyl isocyanate,
2-nitrophenyl-2-chlorosulphonyl vinyl isocyanate,
2-(methoxyphenyl)-2-chlorosulphonyl vinyl isocyanate,
2-(methylsulphonylphenyl)-2-chlorosulphonyl vinyl isocyanate,
2-(phenylsulphonylphenyl)-2-chlorosulphonyl vinyl isocyanate,
2-(acetylphenyl)-2-chlorosulphonyl vinyl isocyanate,
2-(benzoylphenyl)-2-chlorosulphonyl vinyl isocyanate,
2,2-di(chlorosulphonyl) vinyl isocyanate,
2-chloroacetyl-2-chlorosulphonyl vinyl isocyanate,
2-butenyl-2-chlorosulphonyl vinyl isocyanate,
2-(phenylethyl)-2-chlorosulphonyl vinyl isocyanate,
2-chloro-2-chlorosulphonyl vinyl isocyanate, and
2-chlorosulphonyl-cyclohexen-1-yl isocyanate.

The process of this invention may be carried out over a wide temperature range of generally from about 0° C. to about 150° C., preferably at a temperature of from about 40° C. to about 90° C. The chlorosulphonyl vinyl isocyanate product may be separated from the reaction mixture by any suitable known separation procedure such as, for example, by distillation, preferably in vacuo.

Generally, the process of this invention is carried out employing a molar ratio of the reactants of from about 0.1:1 to about 1.2:1 (halogen sulphonic acid : isocyanide dichloride). The preferred molar ratio of the reactants is a molar ratio of about 1:1. The reaction may be carried out in the absence of or in the presence of any suitable inert organic diluent. When an organic diluent is employed, one may use, for example, chlorinated hydrocarbons, such as, chlorobenzene, methylene dichloride, tetrachloroethylene, trichloroethane and the like.

The chlorosulphonyl vinyl isocyanates prepared according to the process of this invention are useful for the production of plant protection agents, dyestuffs and detergents and are valuable comonomers, for example, for the production of plastics.

The invention is further illustrated but is not intended to be limited by the following examples in which all parts and percentages are by weight unless otherwise specified.

EXAMPLE 1

About 985 parts of chlorosulphonic acid are added dropwise at about 60° C. to about 1650 parts of 1,2-dichloroethyl isocyanide dichloride in such a way that a temperature of from about 60° C. to about 70° C. is maintained in the reaction mixture. Hydrogen chloride is given off during the reaction. On completion of the reaction, the reaction product is distilled in vacuo, giving about 1,490 parts of 2-chlorosulphonyl-2-chlorovinyl isocyanate boiling at 103° to 110° C./12 Torr.

EXAMPLE 2

About 232 parts of chlorosulphonic acid are added dropwise at about 30° C. to about 40° C. to about 460 parts of 1,1,2-trichloroethyl isocyanide dichloride. When no more hydrogen chloride is given off, the reaction product is distilled in vacuo giving about 340 parts of 2-chlorosulphonyl dichlorovinyl isocyanate boiling at 109°–115° C./13 Torr.

EXAMPLE 3

About 116 parts of chlorosulphonic acid are added dropwise with stirring and cooling at about 50° C. to about 116 parts of chlorovinyl isocyanide dichloride. When no more hydrogen chloride is given off, the reaction product is distilled in vacuo giving about 160 parts of chlorosulphonyl chlorovinyl isocyanate boiling at 107°–112° C./14 Torr.

EXAMPLE 4

Preparation of a detergent from chlorosulphonyl chlorovinyl isocyanate

A solution of 54 g of tetradecanol-(1) in methylene chloride is added dropwise to a cooled and stirred solution of 51 g of chlorosulphonyl chlorovinyl isocyanate in 250 ml of methylene chloride. After the addition the solvent is distilled off. The remaining urethane chlorovinyl sulphochloride is hydrolized with a 10 percent solution of NaOH at room temperature to the corresponding sulphonate. The sodium sulphonate thus obtained can be used as detergent.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A chlorosulphonyl vinyl isocyanate having the formula

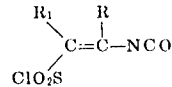

wherein R and $R_1$ are hydrogen, halogen or substituted or unsubstituted radicals selected from the group consisting of alkyl having from one to 20 carbon atoms, aryl having from six to 20 carbon atoms, alkenyl having from seven to 12 carbon atoms and wherein the substituents on said substituted radicals are substituents which are nonreactive with isocyanato groups or with halogen sulphonic acids, the substituents being selected from the group consisting of halogen, nitro, alkyl of from one to four carbon atoms, alkyl sulphonyl wherein the alkyl radical contains one to four carbon atoms, aryl sulphonyl wherein the aryl radical contains six to nine carbon atoms, alkyl carbonyl wherein the alkyl radical contains one to four carbon atoms, aryl carbonyl wherein the aryl radical contains six to nine carbon atoms, chlorosulphonyl or chlorocarbonyl.

2. The isocyanate of claim 1 wherein R is hydrogen and $R_1$ is chlorine.

3. The isocyanate of claim 1 wherein R and $R_1$ are both chlorine.

4. A process for the preparation of a chlorosulphonyl vinyl isocyanate of claim 1 which comprises reacting at a temperature of from about 0° C. to about 150° C. a halogen sulphonic acid having the formula $YSO_3H$ with an isocyanide dichloride selected from the group consisting of an α-halogenated isocyanide dichloride of the formula

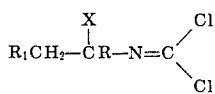

or an α,β-unsaturated isocyanide dichloride of the formula

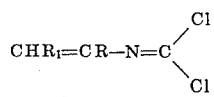

wherein Y and X are halogen and $R_1$ and $R_2$ are as defined in claim 1, such that the molar ratio of halogen sulphonic acid to isocyanide dichloride is from about 0.1:1 to about 1.2:1.

5. The process of claim 4 wherein the reaction is conducted at a temperature of from about 40° C. to about 90° C.

6. The process of claim 4 wherein the molar ratio of halogen sulphonic acid to isocyanide dichloride is about 1:1.

* * * * *